(12) United States Patent
Cheng et al.

(10) Patent No.: US 7,110,338 B2
(45) Date of Patent: Sep. 19, 2006

(54) APPARATUS AND METHOD FOR FINGERPRINTING DIGITAL MEDIA

(75) Inventors: Szeming Cheng, College Station, TX (US); Hong Heather Yu, Princeton Junction, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 862 days.

(21) Appl. No.: 10/213,900

(22) Filed: Aug. 6, 2002

(65) Prior Publication Data

US 2004/0028281 A1 Feb. 12, 2004

(51) Int. Cl.
*G11B 5/09* (2006.01)
*G06K 9/36* (2006.01)

(52) U.S. Cl. .............................. 369/59.1; 369/124.01; 382/100; 382/232; 382/248

(58) Field of Classification Search ............ 369/59.22, 369/48.48, 59.12, 59.17, 59.1, 124.01, 53.1, 369/53.35, 59.26; 382/100, 244, 232, 115, 382/246, 251, 276, 248; 380/210, 268; 713/176; 700/83, 17–19
See application file for complete search history.

(56) References Cited

U.S. PATENT DOCUMENTS

| | | | |
|---|---|---|---|
| 5,859,920 A | 1/1999 | Daly et al. | |
| 5,918,223 A | 6/1999 | Blum et al. | |
| 6,266,429 B1 | 7/2001 | Lord et al. | |
| 6,301,368 B1 * | 10/2001 | Bolle et al. | 382/100 |
| 6,674,707 B1 * | 1/2004 | Ogura et al. | 369/59.22 |
| 6,850,252 B1 * | 2/2005 | Hoffberg | 715/716 |
| 7,020,304 B1 * | 3/2006 | Alattar et al. | 382/100 |

OTHER PUBLICATIONS

Bradenburg, Karlheinz, "MP3 and AAC Explained," AES 17th International Conference on High Quality Audio Coding, pp. 1-12.
Singer, Michael, "Napster To Use Audio Fingerprinting," siliconvalley.internet.com, pp. 1-2, Apr. 20, 2001.
"IFPI and RIAA Announce Search for 'Audio Fingerprinting' Technologies," RIAA/News, pp. 1-2, Jan. 16, 2002.
"Request for Information on Audio Fingerprinting Technologies," RIAA/IFPI 2001, pp. 1-10, Jul. 17, 2001.
Bosi, Marina et al., "ISO/IEC MPEG-2 Advanced Audio Coding," AES, pp. 1-36, Nov. 8-11, 1996.
Herre, Jurgen and Johnston, James D., "Enhancing the Performance of Perceptual Audio Coders by Using Temporal Noise Shaping (TNS)," AES, pp. 1-20, Nov. 8-11, 1996.

* cited by examiner

*Primary Examiner*—Ali Neyzari
(74) *Attorney, Agent, or Firm*—Harness, Dickey & Pierce, PLC (57) ABSTRACT

An apparatus for generating a fingerprint of a digital medium having a partial decoder for generating a partially decoded form of a compressed datastream, feature extractor for extracting at least one invariant feature from the partially decoded form, a fingerprint calculator for computing at least one fingerprint from the extracted invariant feature. An apparatus for authenticating fingerprints and methods for generating and authenticating fingerprints.

50 Claims, 5 Drawing Sheets

APPARATUS AND METHOD FOR FINGERPRINTING DIGITAL MEDIA

FIELD OF THE INVENTION

The present invention relates generally to invariant representation of a digital medium and more particularly to generating fingerprints of a digital medium for secure real-time access and distribution.

BACKGROUND OF THE INVENTION

Evolution of the Internet has caused an enormous increase in the use of digital media. Internet has become the primary channel for transmitting digital data to distant locations. A digital media such as digital audio, digital video, and digital images can be easily created, edited, converted and delivered using a computer connected to the Internet. Consequently, digital medium has faced problems of piracy as described next.

Pirates now have easy access to the tools necessary to make illegal copies and unauthorized use of proprietary material contained in a digital medium. For example, music is rampantly pirated in the form of MP3 format files, which are easily created and illegally proliferated with a minimal skill level. For example, a pirate can copy a piece of music stored on a compact disk (CD) and convert it into MP3 format files using generic and freely available tools. The pirate then uses a peer-to-peer file-sharing network to freely distribute such MP3 format files on a worldwide scale. Thus, there is a need for a mechanism by which the rightful owner of an electronic content can robustly control copying, secure copyrights, prevent illegal distribution, and provide easy tracking of pirated materials. Many techniques are known for content protection purposes. An overview of the field of fingerprinting as for content security applications is discussed next.

Methods for controlling use of electronic materials exist. One such family of methods is termed as "media fingerprinting". Fingerprinting refers to the technology that extracts a fingerprint of and from a source medium. The extracted fingerprint may then be stored on a variety of different storage mechanisms like databases or data-stores for subsequent use in tracking copies of the source medium. A fingerprint of a medium is a small and unique mark or characteristic of the medium from which the mark is generated or extracted from. The fingerprint is small in size as compared to the source media datastream. A given fingerprint is also unique as compared to all other fingerprints in the database(s) or data-stores. It usually can be used to identify the source medium. It can also be used to determine the originality of a piece of medium. In general, the criteria for a successful media fingerprinting include uniqueness as well as robustness, i.e., robustness against common processing noise. Desirable features of a fingerprint in the context of various operations carried out on the medium are described next.

The fingerprint should not change after a given medium undergoes processing such as compression, scaling, blurring, reprinting, etc. These common signal-processing tasks often do not alter the overall structure or the overall appearance of the medium data; however, each such processing task would alter the details of the medium data to various degrees. Therefore, there is a need for a robust representation of medium content, so that the representation is invariant against common processing noises, and can preserve the fingerprint under any common signal processing. Security aspects of fingerprinting are described next.

At times, it is also desirable to have survivability towards certain intentional attacks. That is, ideally, any processing on the medium that does not change the perceptual content of the medium should not change the fingerprint. For instance, a fingerprint of a song in a digital form should not change without distorting the music. Media fingerprinting is an effective and easy to implement technique for protecting electronic content stored on a digital medium. There is a need for an implementation of a fingerprinting method, which is commercially viable, low cost, and operates in a real-time mode. Various known approaches to fingerprinting and their limitations are as described next.

One approach toward fingerprinting embeds fingerprint data in a source medium and then uses a decoding medium to recover the original medium. This approach is often termed as "active fingerprinting". For example, U.S. Pat. No. 5,859,920 to Daly et al. creates an encoded source image embedded with source data. Active fingerprint typically accompanies the source media data; hence, there is no need to connect to a network for fingerprint verification. The drawback, however, is that when the source medium is altered, the fingerprint can easily get lost. It is sometimes desirable to transform the source medium in a content preserving way in order to adapt to different application requirements and networking conditions. For instance, compression and transcoding are among the most frequently used transformations.

Another approach is termed as "passive fingerprinting". Passive fingerprinting refers to the system and method that saves the extracted fingerprint in a remote secure server. Technologies dealing with passive fingerprints are known in the art. For example, U.S. Pat. No. 5,918,223 to Blum, et al., discloses forming a vector of features from audio files. However, this approach is not directed to compressed media.

A digital medium is often stored, processed or transmitted in a variety of compressed formats. Compressed formats for contents stored on digital media are preferred due to huge sizes of electronic media files. Storing and processing such huge files is a complex and slow process. Thus, there is a need for an apparatus and method for authenticating and securing electronic media existing in the compressed format. Such apparatus and method should operate in a speedy manner to process large media file sizes for real-time or streaming applications.

Therefore, is a need for a robust fingerprinting apparatus and method. The fingerprinting apparatus and method should generate unique fingerprints that are robust against common processing noise. Further, the fingerprint should be able to survive certain intentional attacks.

SUMMARY OF THE INVENTION

An apparatus for fingerprint generation includes a feature extractor for processing a datastream for extracting invariant features. The datastream may be compressed or decompressed. A partial decoder converts the compressed media into partially decoded form for further processing. A fingerprint calculator utilizes invariant features to generate fingerprints. One embodiment includes a partition maker for separating a compressed datastream into segments. An index processor generates index numbers (also termed as indices) from the analysis of segments. A vector generator builds a characteristic vector for a fingerprint generator to create a fingerprint. One embodiment operates to record multiple indices per segment. Another embodiment is a fingerprint authentication apparatus. Methods for fingerprint generation and authentication are also disclosed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
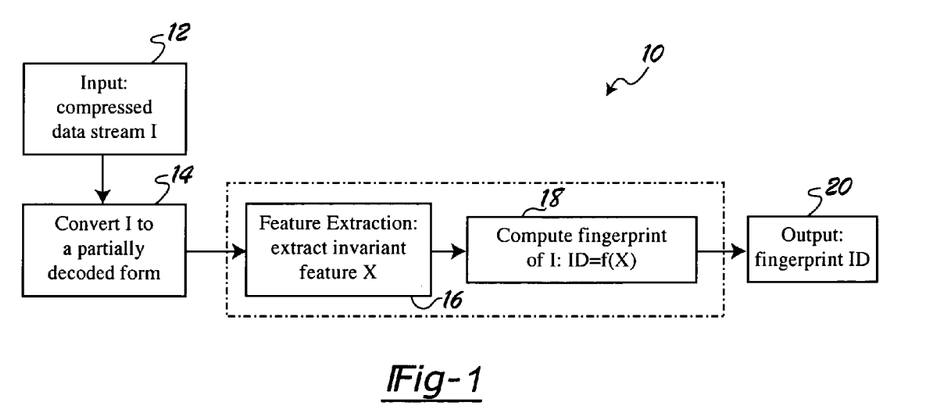
FIG. 1 is a block diagram of an embodiment for generating fingerprints.

FIG. 1 is a block diagram of an embodiment for generating fingerprints. Fingerprinting is a preferred method for efficient identification of electronic media. Digital fingerprints are constructed from the characteristics of a digital object that tends to distinguish it from other similar digital objects. "Fingerprints" hereinafter mean digital fingerprints. Fingerprinting can be used for a variety of purposes. For example, fingerprinting can be used for database organization (indexing and retrieval) and for identifying ownership of a given data medium. Fingerprinting enables an owner of a digital object or medium to track down any unauthorized use or unauthorized distribution of the digital object or medium. Fingerprints can be embedded in a variety of target media such as audio, video or image and then such media can be distributed to users.

Operations described as real-time here are to mean a time-constrained operation where there are relatively stringent requirements on the amount of time in which the operation can be performed.

The fingerprinting apparatus 10 is preferably implemented as a software system, hardware system or as a combination of hardware and software system. The apparatus 10 can be incorporated in a wide variety of electronic devices, for example in devices such as personal music players, computers, and personal digital assistants. The invention is not limited by the choice of a device or a form selected for its implementation.

The invention operates on a variety of digital mediums, for example, images, audio and video in digital form. Generally, digital mediums are stored in compressed form, but the invention can also operate on non-compressed or decompressed datastreams sourced from a given digital medium. While working on decompressed medium, a preliminary step of converting the decompressed datastream into a frequency domain is performed after which the fingerprint generation process proceeds in the same manner as that for compressed datastream. Those skilled in the art will appreciate that a specific medium or its compressed nature is selected hereinafter in a given context only for the purpose of explanation or illustration and the same is not limiting.

An input mechanism 12 feeds a compressed datastream as an input for a partial decoder 14. The compressed datastream is preferably converted to a partially decoded form, which can then be processed to extract a fingerprint. The partial decoder 14 converts the compressed datastream into a partially decoded form. The partial decoder may decode the compressed datastream into quantization indices or dequantized MDCT (modified discrete cosine transform) coefficients for feature extraction purposes. The partial decoder 14 can be designed to performing partial decoding at any user chosen stage in the medium transformation and/or coding process. The invention is not limited by the choice of a particular type of a partially decoded form. Those skilled in the art will appreciate that any suitable partially decoded form can be chosen to achieve similar effect.

The partial decoder 14 feeds the partially decoded form of the digital medium to a feature extractor 16. Feature extractor 16 extracts an invariant feature based on the compressed datastream received as an input from the partial decoder 14. Invariant feature is a characteristic that is unaffected by a designated operation or a transformation. Basing a feature on an invariant feature of the digital medium ensures that the computed fingerprint remains valid irrespective of usual transformations that a medium may undergo.

Fingerprint calculator 18 receives the invariant feature extracted by the feature extractor 16 and computes a fingerprint. Fingerprint calculator 18 determines the fingerprint as a function of the invariant feature extracted by the feature extractor 16. An output mechanism 20 outputs the fingerprint generated by the fingerprint calculator 18. An embodiment of the fingerprinting apparatus using the principle of the invention is described above. Embodiments using either single or multiple indices per segment are described next. First, an embodiment using single index per segment is described next.

Figure 2:
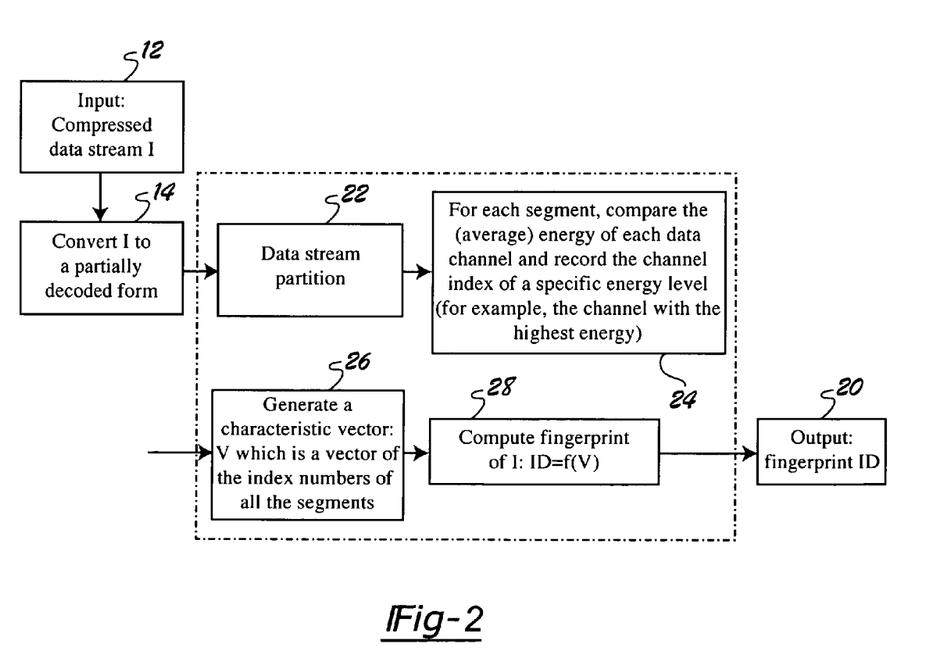
FIG. 2 is a block diagram of an embodiment utilizing one index per segment.

FIG. 2 is a block diagram of an embodiment utilizing one index per segment. The embodiment utilizing one index per segment operates relatively fast in terms of computational time required to generate a fingerprint. Single index per segment leads to a smaller fingerprint, and hence needs relatively less storage space. An input mechanism 12 feeds a compressed datastream to the partial decoder 14, which converts the compressed datastream into a partially decoded form. The partially decoder 14 feeds the partially decoded form to a partition-maker 22. The partition-maker 22 partitions the received partially decoded form of the compressed datastream into multiple segments.

A single index processor 24 analyzes each segment by first calculating and then comparing the average energy of each data-channel. The single index processor 24 records the channel index of a specific energy level. For example, the average energy for an audio channel can be calculated using the following equation:

$$E_T(b) = E_{t \in T}[x(t, b)^2],$$

for a particular time frame T and a band b.

The specific energy level to be used is left to the choice of a user. The invention is not limited by the choice of any specific energy level. Those skilled in the art will appreciate that a variety of choices for the specific energy levels are covered by the invention. For example, a user can choose the specific energy level to be the channel with the highest energy level for an audio channel. The equation for choosing the highest energy level for an audio channel would be as follows:

$$fp(T) = \underset{b}{\operatorname{argmax}}\,[E_T(b)]$$

A vector generator 26 generates a characteristic vector 'V', which is the vector of the index numbers of all the segments. A fingerprint generator 28 computes the fingerprint as a function of the characteristic vector 'V'. A digital signature can be generated from the fingerprint. An output mechanism 20 outputs the fingerprint generated by the fingerprint generator 28. Embodiment utilizing multiple indices per segment is described next.

Figure 3:
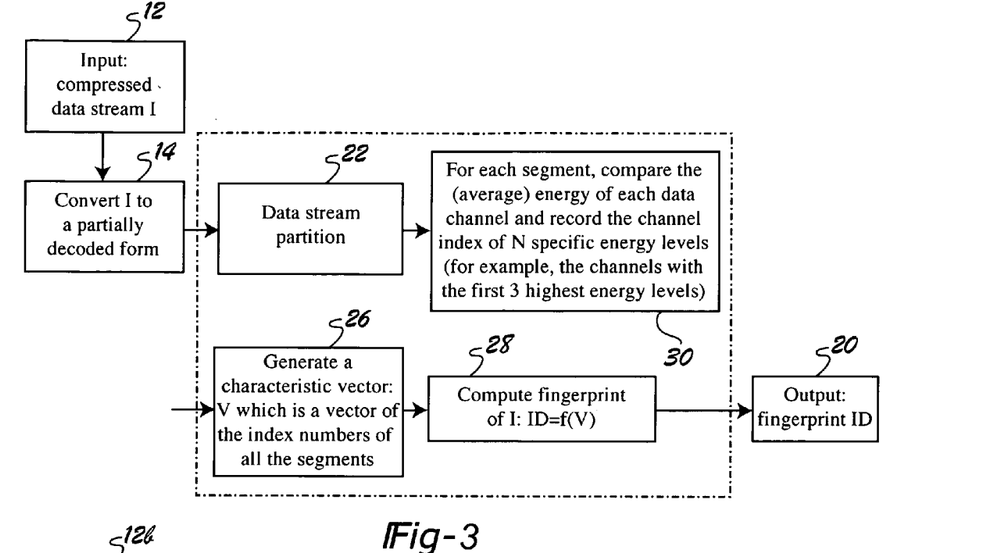
FIG. 3 is a block diagram of an embodiment utilizing multiple indices per segment.

FIG. 3 is a block diagram of an embodiment utilizing multiple indices per segment. Utilizing Multiple indices can provide relatively better performance and accuracy when working on large databases or data-stores. This embodiment is broadly similar to the embodiment shown in FIG. 2, except for the differences due to processing of multiple indices per segment. The input mechanism 12, the partially decoder 14, the output mechanism 20, the partition-maker 22, the vector generator 26 and the fingerprint generator 28 broadly operate in a similar manner as described in context of the embodiment shown by FIG. 2. Returning to FIG. 3, a multiple index processor 30 analyzes each segment by comparing the average energy of each data-channel and records the channel index of 'N' specific energy levels. A user can choose the 'N' specific energy levels. For example, the user can choose the 'N' specific energy levels to be the channels with the first three highest energy levels.

To illustrate the embodiments shown in FIGS. 2 and 3, a compressed audio domain is considered. Common examples of compressed audio domains are MP3 and advanced audio coding (AAC). Other compressed audio domains can also be substituted. Fingerprint of a compressed audio domain can be easily generated and can be used for identification of audio content, and for comparing it with fingerprints in a pre-stored library.

The compressed datastream is preferably converted to a partially decoded form, which can then be processed to extract a fingerprint. The MP3 format is considered as an example of extracting a fingerprint from a partially decoded form as described next.

A minimal sufficient characteristic is extracted from the partially decoded datastream using the feature extractor 16 (as shown in FIG. 1). The extracted characteristics are invariant features. The extraction of invariant features involves processing a large amount of data, and needs to be done at an extremely fast rate for each input sample, particularly so in a real-time application. While achieving a fast rate, the resulting characteristic should be capable of sufficiently distinguishing two different songs. Experimental results have shown that the above described method that uses energy indices to extract a fingerprint provides such properties and capabilities.

The single index processor 24 (in context of FIG. 2) or the multiple index processor 30 (in context of FIG. 3) analyzes a given time-segment and records the band index having highest average energy. The vector generator 26 generates a characteristic vector 'V' for the analyzed time segment. An advantage of recording only the index is that the abstracted characteristic is invariant with respect to the volume of the song. To illustrate, a time segment of five consecutive frames is considered, which means that five times 1024 samples is approximately about 0.1 second duration. A song of 20-second duration will generate a characteristic vector 'V' of about 200 elements. Fingerprint generator 28 computes the fingerprint as a function of the characteristic vector 'V'. Output mechanism 20 outputs the fingerprint generated by the fingerprint generator 28.

Figure 4:
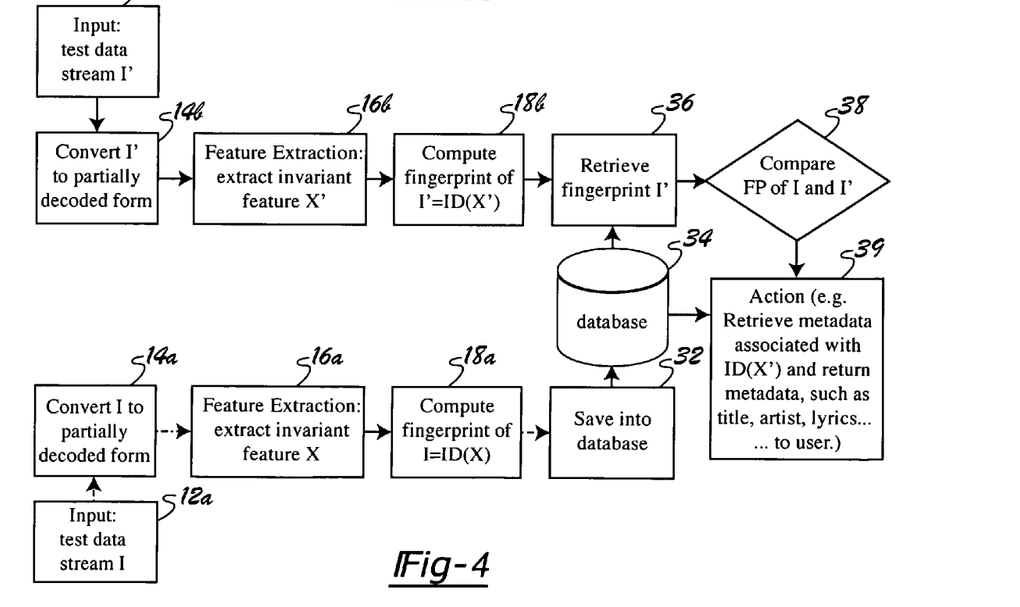
FIG. 4 shows an embodiment to generate and compare fingerprints.

FIG. 4 shows an embodiment for generating and comparing fingerprints. For explanatory purposes, the two similar input mechanisms 12 are labeled as 12a and 12b. Similarly, for explanatory purposes, the two similar partial decoders 14 are labeled as 14a and 14b, two similar feature extractors 16 are labeled as 16a and 16b, and two similar fingerprint creators 18 are labeled as 18a and 18b, respectively.

An input mechanism 12a feeds a compressed datastream I to the partial decoder 14a, which converts the compressed datastream into a partially decoded form. The feature extractor 16a extracts invariant features from the datastream I. The fingerprint generator 18a generates a fingerprint FP(I)=f(fp$_I$(T)) of I based on the invariant features. A saving module 32 saves the generated fingerprint of I in the database 34. An input mechanism 12b feeds the test datastream (I') to the partial decoder 14b, which converts the compressed datastream into a partially decoded form. The feature extractor 16b extracts invariant features from the datastream I'. The fingerprint generator 18b generates a fingerprint I' based on the invariant features.

A retrieving module 36 retrieves fingerprint of I' from the database 34 and sends it to a comparing module 38. The comparing module 38 compares the fingerprints of I' with all of the fingerprints of the datastreams in the database. For example, the database's size is assumed to be N, which means the database has N datastreams: $I_1, I_2, I_n \ldots I_N$. Compare $I_n$ with I', dis(n)=FP($I_n$)–FP(I'). If I' is close to a datastream $I_x$ in the database, x=argmin$_n$[dis(n)] & dis(x) <delta, where delta is a threshold, $I_x$ and its associated meta data maybe retrieved. The following sample equation maybe used for correlation based comparison:

$$ss = \frac{E[(fp(T) - E[fp(T)])(fp'(T) - E[fp'(T)])]}{\sqrt{E[(fp(T) - E[fp(T)])^2]E[(fp'(T) - E[fp'(T)])^2]}}$$

where E[.] represents an expectation of a random variable. Meta-data retriever 39 retrieves items such as title, artist, lyrics etc., which are associated with I', for showing to the user or for further processing.

In the event of tracking for illegal use of digital medium or in other copyright protection applications, if $I_x$ is close enough to I', it might be used to prove ownership of the medium content in a dispute concerning ownership of the medium content.

Figure 5:
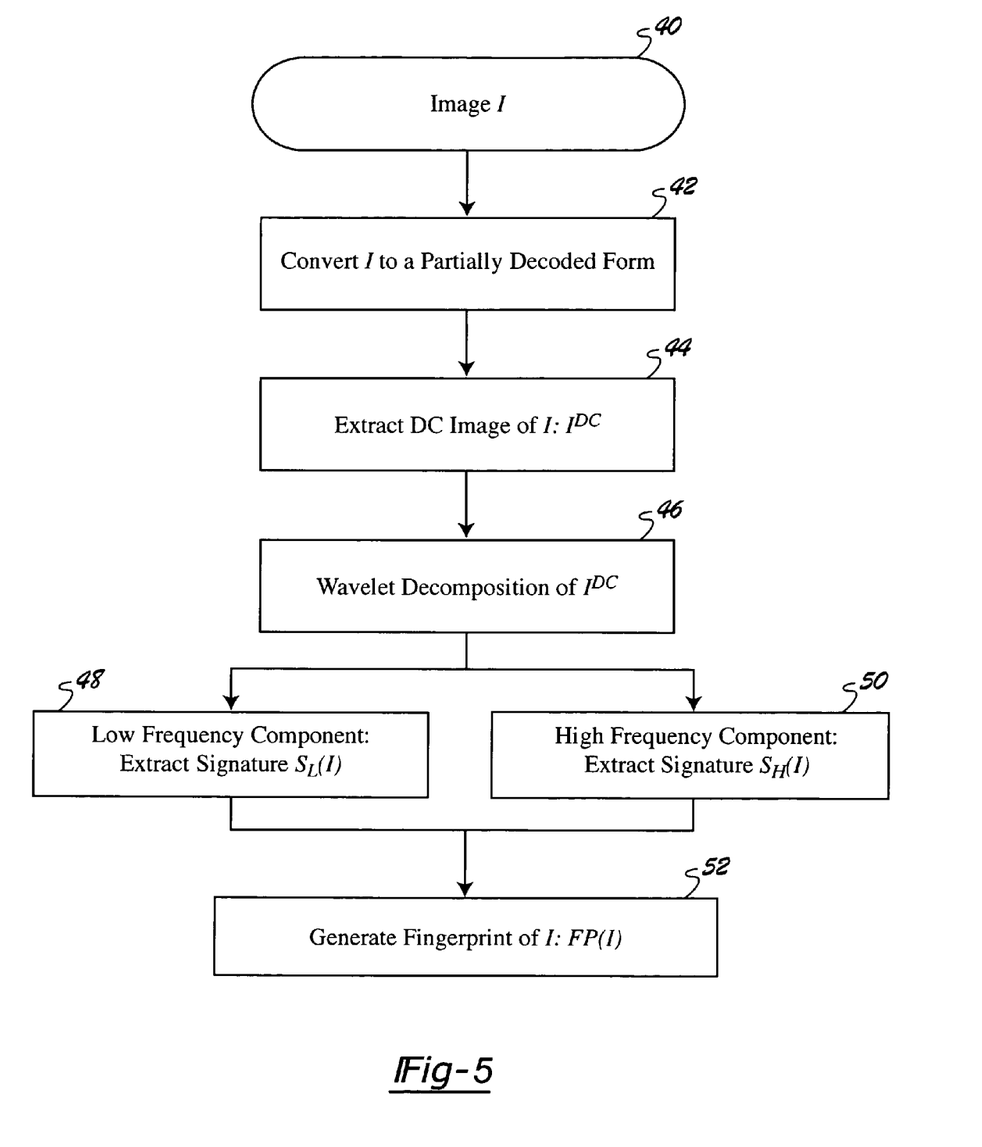
FIG. 5 is a flow diagram of a method to generate fingerprints.

FIG. 5 is a flowchart of a method to generate fingerprints. The method extracts an invariant representation of a medium via a Q-metric to construct a fingerprint of the medium. As an example, an image medium is discussed for applying the method. The invention is not limited to any particular type of electronic media. Those skilled in the art will appreciate that the medium can be any suitable digital medium. For example, suitable medium can be audio or video.

At step 40, the image I is taken as an input medium, which may exist in a compressed form. High-resolution images are prone to have huge file sizes, hence are preferably stored in a compressed format. The image in a compressed form is converted to a partially decoded form at step 42. A compressed image can be recovered as a an operatively accurate content representation of the image by using only the few largest discrete cosine transforms (DCT) or wavelets coefficients, while discarding part or all of the smaller coefficients. If the coefficients are arranged properly, the obtainable invariance can be used in various applications. DC image of the input image or a video frame I is extracted at step 44 and is represented as $I^{DC}$. DC image may be generated using the DC coefficients of each 8×8 block in a JPEG format image or a MPEG format video. At step 46, a wavelet decomposition of $I^{DC}$ is performed.

Let I' represent the source medium datastream I after a given processing, for example, compression or transcoding. Denote FP(I) and FP(I') the fingerprint extracted from I and I' respectively. Based on the above discussion (with particular reference to paragraph [0004]), a medium fingerprint should observe FP(I)−FP(I')=0. That is, the fingerprint extracted from the original medium datastream and the transformed medium datastream (after content preserving transformation) should be the same. Assuming that $\tilde{I}$ represents the partially decoded image I and $\{\tilde{I}^*(x,y)=\tilde{I}(x,y)$ if $\tilde{I}(x,y)<\epsilon(x,y)$, $\tilde{I}^*(x,y)=0$ otherwise, for the $(x,y)^{th}$ coefficient$\}$ Let $I^{DC^*}$ represent $I^{DC}$ after wavelet transformation. In accordance, $\{I^{DC^*}(x,y)=I^{DC}(x,y)$ if $I^{DC}(x,y)<\epsilon(x,y)$, $I^{DC^*}(x,y)=0$ otherwise, for the $(x,y)$th coefficient of the DC image$\}$.

The L-signature ($S_L$) and the H-signature ($S_H$) of an image are defined as follows:

$$S_L(I) = (\delta(\tilde{I}(x,y))) = \begin{pmatrix} \delta(\tilde{I}(0,0)) & \delta(\tilde{I}(1,0)) & \cdots \\ \delta(\tilde{I}(0,1)) & \ddots & \\ \vdots & & \ddots \end{pmatrix}, (x,y)\varepsilon I_L$$

$I_L$ for images. Similarly, we have $$S_H(I) = (\delta(\tilde{I}(x,y))) = \begin{pmatrix} \delta(\tilde{I}(x',y')) & \delta(\tilde{I}(x'+1,y')) & \cdots \\ \delta(\tilde{I}(x',y'+1)) & \ddots & \\ \vdots & & \ddots \end{pmatrix}, (x,y)\varepsilon I_H.$$

where $\delta(\tilde{I}(x,y))=n$, when $\epsilon_{n-1}<\tilde{I}(x,y)\leq\epsilon_n$, and n=0, 1, 2 . . . ,. Here, I(x,y) can be a single channel or a multi-channel intensity function. At step 52, the fingerprint is generated as FP(I)=FP($I^{DC}$)=f($S_L(I^{DC})$, $S_H(I^{DC})$). A saving module may save the fingerprint into a secure database for future retrieval. Fingerprint retrieval and copyright identification can be done similarly as described above with a particular reference to paragraphs [0032] and [0033].

MPEG transcoding is a widely used method. In a type I MPEG transcoding, the coding bit rate changes while the structure is preserved, i.e., the GOP (group of picture) structure is preserved. In this case, the DC coefficients of each frame of the source video do not change after the transcoding. That means, $I^{DC'}=I^{DC}$. Therefore, FP(I)−FP(I')= FP($I^{DC}$)−FP($I^{DC'}$)=0. In this case, f maybe defined as an identity transformation or matrix. Because FP(I) is invariant, it may be used for various applications, such as content based media authentication discussed below.

Figure 6:
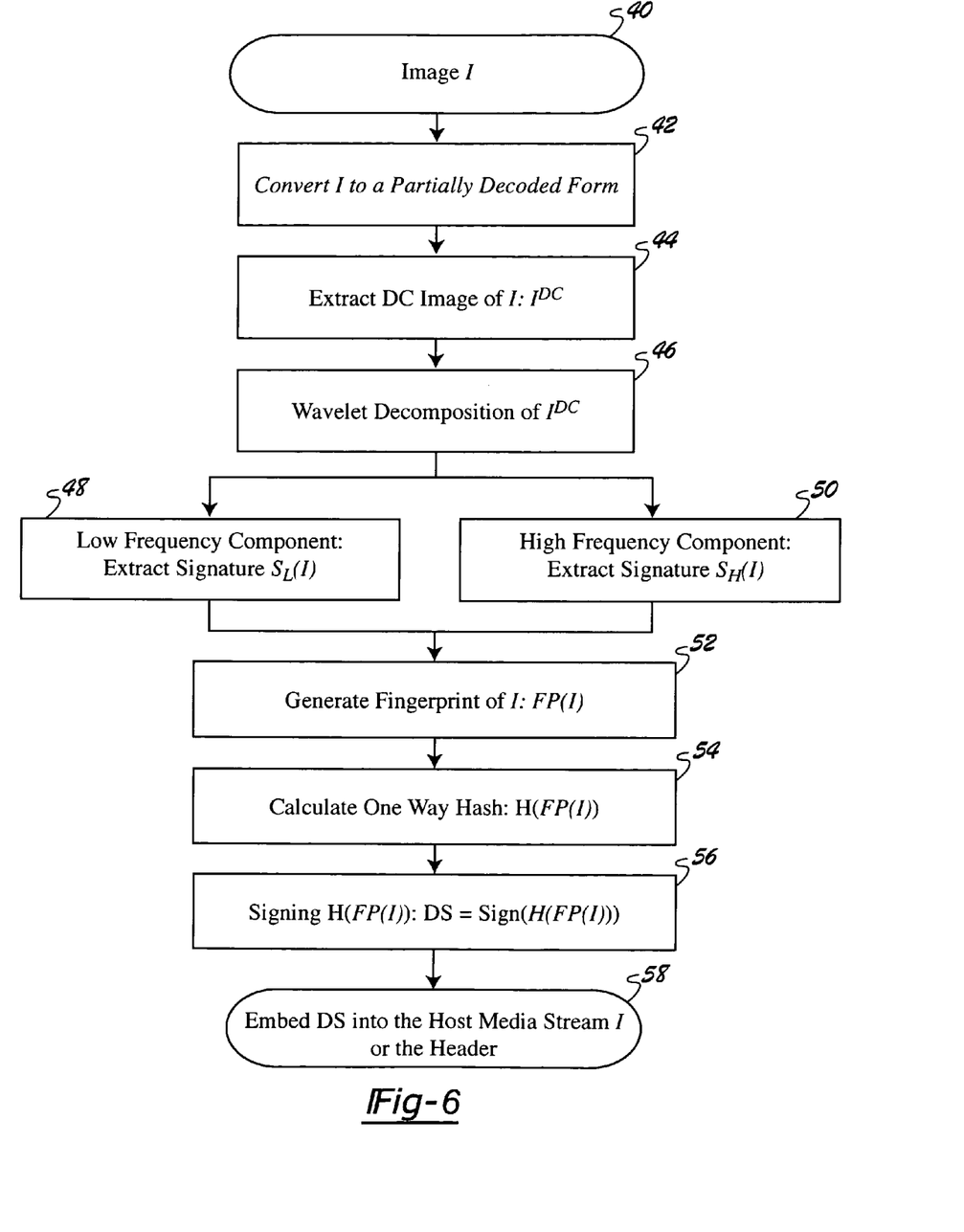
FIG. 6 is a flowchart for showing an embodiment using content-based media authentication.

FIG. 6 is a flowchart for an embodiment using content-based media authentication. Networked environments and applications sometimes require a medium authentication algorithm to survive various content preserving variations, such as compression and transcoding. For example, if a medium is distributed over several kinds of networks with different bandwidths, the source medium datastream may need to be compressed using different coding bit rate or transcoded to a different bit rate or to a different format for transmission. It is desirable that after such operations/transformations (such as compression and transcoding), the authenticity of the source medium can still be verified.

Conventional authentication algorithm authenticates the entire datastream (message) in a manner that even one bit of change will cause the authenticity check result to be negative. Content preserving transformations, such as compression and transcoding, often change many bits of the datastream without altering the actual content of the medium. Hence, conventional authentication methods cannot provide authenticity verification after any transformations including content preserving transformations.

The present invention provides methods and apparatus for media content authentication. A content invariant fingerprint FP(I) of a source medium I is extracted. Then the fingerprint FP(I) is authenticated using conventional authentication algorithms, for example, one-way hash function. A digital signature can be generated after the authentication value is encrypted using a public key or secret key encryption algorithm. The digital signature maybe saved in a remote secure server, embedded in the source medium robustly, or inserted in the header part of the source medium file for medium authenticity and integrity verification in various applications.

It may be necessary that the media authentication algorithm operating in a networked environment should perform in a real time manner. The above discussed fingerprinting extraction method that directly works on a partially decoded (compressed) medium datastream provides such real time capability. The steps 40–52 are broadly similar to those previously discussed in context of FIG. 5. At step 54 a one-way hash function H(FP(I)) is calculated, based on the fingerprint. A one-way has function module can be used as a hash function generator that can calculate H(FP(I)). A signing function is used to generate a digital signature. A signing module can be used to perform the operation of the signing function. The signing function is calculated as Sign(H(FP(I))) at step 56. The digital signature may be saved on a remote security server as an embedded object in a target medium. The choice of the specific target medium for embedding the digital signature will depend on a given application. For example, the digital signature may be embedded in the host medium stream or inserted in the header of the host medium file. Preceding description states in detail the fingerprinting process. A different view of the fingerprinting process is described next.

Figure 7:
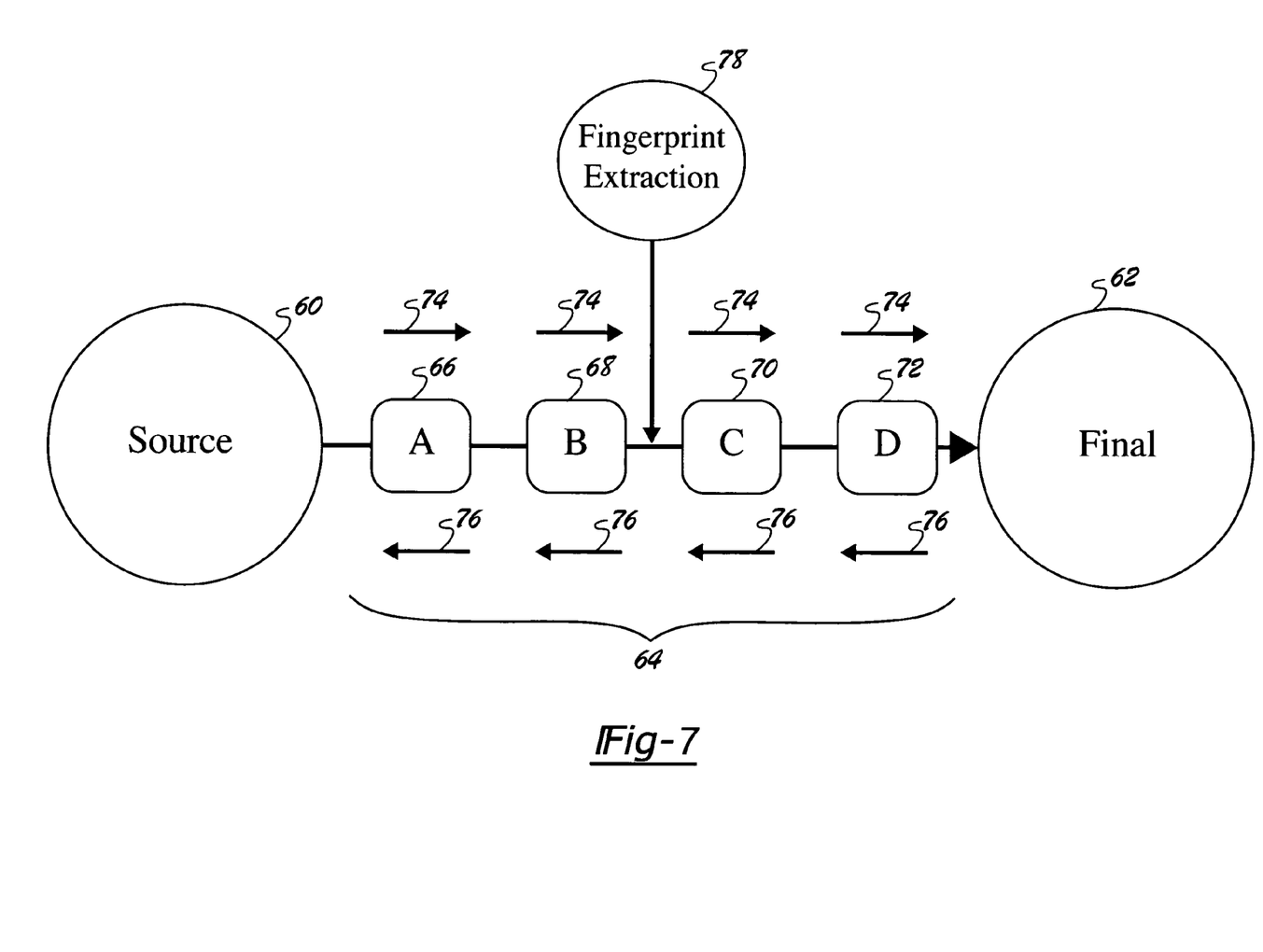
FIG. 7 is a schematic of the fingerprinting process.

FIG. 7 is a schematic of the fingerprinting process. The source 60 is a digital medium existing in a given state. A process 64 converts the source medium 60 into a final medium 62, which is in a different state than the source medium 60. Process 64 is typically a sequential and reversible process. The process 64 shown here includes illustrative steps A 66, step B 68, step C 70 and step D 72. Those skilled in the art will appreciate that the steps A 66, step B 68, step C 70 and step D 72 are shown only as typical examples. Some examples of steps are as follows: filtering, quantization, coding, and compression. A given process may contain many different steps, sub-steps or alternative steps also. The principle of the invention applies irrespective of the particular sequence and structuring of the intermediate steps of the process 64 in a particular implementation.

The process 64 operates along a given first path 74. The process 64 can also operate along a second path 76, which is a relative and substantial inverse of the first path 74. As a result, the process 64 can be directed according to the first path 74 to transform the source medium 60 into the final medium 62. Similarly, the process 64 can be directed according to the second path 76 to transform the final medium 62 into the source medium 60.

Fingerprint can be extracted after any of the intermediate steps A 66, step B 68, step C 70 and step D 72. For example, as shown a fingerprint extraction 78 can be performed after the step B 68 but before step 70. Partial decoding has been discussed above in detail. Partial decoding in the context of this overview (as shown) will mean the source is only partially 'decoded' for extraction of the fingerprint. The partial here signifies the event position of after the steps A 66 and step B 68, and in contrast to full decoding, which ultimately yields the final medium 62.

Partially decoded form generally represents any intermediate form that is different from the source medium 60 and the final medium 62. Partially decoded form does not imply that the source medium 60 should always be coded in some manner, but it may be coded in a given case. Partial decoding is used as a representative term, and it may be called partial transformation or partial decompression depending on the context.

Fingerprinting overview is now discussed in the context of an example of a JPEG image processing process. Here, we assume that the source is a compressed JPEG image that is based on a lossy JPEG compression scheme. The process 64 represents the JPEG compression algorithm operating in reverse to reconstruct a compressed image. Step A 66 represents Huffman-decoding, step B 68 represents de-quantization, and step C 70 representing reversal of the DCT data redundancy removal. The fingerprint extraction would be performed using the principle and techniques of the invention on partially decoded data. Partially decoding in the this context would mean that fingerprint is extracted from the data at an intermediate stage just after the step A 66 and step B 68, i.e. after performing Huffman-decoding and de-quantization. Various aspects of using the fingerprinting process are described next.

This invention makes fingerprinting process a fast executing process that is effective for feature abstractions. The fingerprint generation and retrieval process is made robust enough to sustain against wide variety of transformations. In addition, by authenticating the content invariant fingerprint of a medium datastream instead of the source medium datastream, content-based authentication is achieved. Because the fingerprint is unique to each medium, the same fingerprint can be generated after a medium is compressed or transcoded while any content changing operation will modify the fingerprint. Hence, the authenticity and integrity of a medium datastream can be verified even after content preserving variations like compression and transcoding. The invention works directly on compressed domains and provides a real-time performance.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for generating a fingerprint of a digital medium, comprising:
    a datastream being sourced from the digital medium;
    a partial decoder converting said datastream into a partially decoded form;
    a feature extractor extracting at least one invariant feature from said partially decoded form; and
    a fingerprint calculator computing at least one fingerprint from said at least one invariant feature.

2. The apparatus of claim 1 further comprising:
    an input mechanism for channeling said datastream from the digital medium into said partial decoder; and
    an output mechanism for outputting said at least one fingerprint to an output device.

3. The apparatus of claim 1 wherein said partially decoder converting said datastream into a partially decoded form selected from the group consisting of frequency domain transformations, discrete cosine transforms, modified discrete cosine transforms, quantized forms, and post-quantization coded forms.

4. The apparatus of claim 1 wherein said feature extractor extracting a minimum sufficient characteristic from said partially decoded form.

5. The apparatus of claim 4 wherein said at least one invariant feature comprising said minimum sufficient characteristic of said partially decoded form.

6. The apparatus of claim 1 wherein said fingerprint calculator computing said at least one fingerprint as a function of said invariant feature extracted by said feature extractor.

7. The apparatus of claim 1 wherein said datastream comprises a compressed form.

8. The apparatus of claim 1 wherein said datastream comprises a decompressed form.

9. The apparatus of claim 1 wherein said partially decoded form is selected from a group consisting of partially transformed form and partially decompressed form.

10. The apparatus of claim 1 further comprising:
    at least one hardware device; and
    said hardware device including said partial decoder, said feature extractor and said fingerprint calculator.

11. The apparatus of claim 1 further comprising:
    at least one software module; and
    said software module including said partial decoder, said feature extractor and said fingerprint calculator.

12. The apparatus of claim 1 further comprising:
    at least one device having a combination of a hardware element and a software module; and
    said device including said partial decoder, said feature extractor and said fingerprint calculator.

13. An apparatus for generating a fingerprint of a digital medium, comprising:
    a datastream being sourced from the digital medium;
    a partial decoder for converting said datastream into a partially decoded form;
    a partition maker separating said partially decoded form into a plurality of segments;

an index processor for analyzing said segments to generate a predetermined number of indices;

a vector generator for building a characteristic vector from said indices; and a fingerprint generator generating at least one fingerprint, said fingerprint being a function of said characteristic vector.

14. The apparatus of claim 13 further comprising:
a digital signature generator for generating a digital signature from said fingerprint.

15. The apparatus of claim 13 wherein said predetermined number of indices comprises at least one index.

16. The apparatus of claim 13 wherein said predetermined number of indices comprises at least two indices.

17. The apparatus of claim 13 further comprising:
an input mechanism for channeling said datastream from the digital medium into said partial decoder; and
an output mechanism for outputting said at least one fingerprint from received from said fingerprint generator to an output device.

18. The apparatus of claim 13 wherein said index processor comparing the average energy of each of a plurality of channels associated with each of said segments.

19. The apparatus of claim 18 wherein said index processor further recording a channel index of a specific energy level.

20. The apparatus of claim 19 wherein said specific energy level corresponding to one selected said channel having a pre-determined energy level.

21. The apparatus of claim 19 wherein said specific energy level corresponding to a selected number of said channels having pre-determined energy levels.

22. The apparatus of claim 18 wherein said index processor further recording channel indices of more than one said specific energy levels.

23. The apparatus of claim 13 operating in a real-time mode.

24. The apparatus of claim 13 wherein said datastream comprises a compressed form.

25. The apparatus of claim 13 wherein said datastream comprises an decompressed form.

26. The apparatus of claim 13 wherein said datastream comprising an audio datastream being chosen from a group consisting of MP3 encoded media and advanced audio coding (AAC) encoded media.

27. The apparatus of claim 26 wherein partial decoder converting said audio datastream into said partially decoded form, said index processor analyzing said segments for generating a band index having the highest average energy, said vector generator building said characteristic vector from said band index, said fingerprint generating a fingerprint of said audio datastream.

28. The apparatus of claim 27 wherein said characteristic vector is invariant in relation to the volume of said audio datastream.

29. A method for generating a fingerprint, the method comprising the steps of:
converting a source medium into a final medium using a process having a predetermined number of steps;
performing a selection of said steps for generating an intermediate form of said source medium, said intermediate form being distinct in comparison to said source medium and said final medium; and
extracting at least one fingerprint from said intermediate form of said source medium.

30. The method of claim 29 wherein said source medium comprising a compressed digital medium.

31. The method of claim 29 wherein said source medium comprising a decompressed digital medium.

32. The method of claim 29 wherein said intermediate form being chosen from a group consisting of partially decoded form, partially transformed form, partially filtered form, partially quantized form and partially decompressed form.

33. The method of claim 29 wherein said process being chosen from a group consisting of decoding, transformation, filtering, quantization and decompression.

34. The method of claim 29 further comprising the step of:
embedding said at least one fingerprint into a target.

35. A method for generating a fingerprint from a digital medium, the method comprising the steps of:
sourcing a datastream from the digital medium;
converting said datastream into a partially decoded form;
extracting at least one invariant feature from said partially decoded form; and
calculating at least one fingerprint from said at least one invariant feature.

36. The method of claim 35 further comprising the step of:
embedding said fingerprint into a target.

37. A method for generating a fingerprint of a digital medium, the method comprising the steps of:
sourcing a datastream from the digital medium;
converting said datastream into a partially decoded form;
partitioning said partially decoded form into a plurality of segments;
analyzing said segments for generating a predetermined number of indices;
constructing a characteristic vector from said indices; and
generating at least one fingerprint, said fingerprint being a function of said characteristic vector.

38. The method of claim 37 further comprising:
generating a digital signature from said fingerprint.

39. The method of claim 37 wherein said predetermined number of indices comprising at least one index.

40. The method of claim 37 wherein said predetermined number of indices comprising at least two indices.

41. The method of claim 37 further comprising the steps of:
comparing an average energy of each one of a plurality of channels associated with each one of said segments.

42. The method of claim 41 further comprising the step of:
recording a channel index of a specific energy level.

43. The method of claim 42 wherein said specific energy level corresponding to one selected said channel having a pre-determined energy level.

44. The method of claim 43 further comprising the step of:
recording channel indices of more than one said specific energy levels.

45. The method of claim 44 wherein said specific energy level corresponding to a selected number of said channels having pre-determined energy levels.

46. The method of claim 37 wherein said data stream comprises a compressed form.

47. The method of claim 37 wherein said data stream comprises an decompressed form.

48. The method of claim 37 wherein said data stream comprising an audio datastream being chosen from a group consisting of MP3 encoded media and advanced audio coding (AAC) encoded media.

49. The method of claim 48 wherein said step of converting comprising converting said audio data stream into said partially decoded form, said step of analyzing comprising analyzing said segments for generating a band index having the highest average energy, said step of constructing comprising building said characteristic vector from said band index, said fingerprint being a fingerprint of said audio datastream.

50. The apparatus of claim 48 wherein said characteristic vector is invariant in relation to the volume of said audio datastream.

* * * * *